United States Patent
Kawahara et al.

(10) Patent No.: US 9,342,757 B2
(45) Date of Patent: May 17, 2016

(54) PATTERN RECOGNITION APPARATUS, METHOD THEREOF, AND PROGRAM PRODUCT THEREFOR

(71) Applicant: KABUSHIKI KAISHA TOSHIBA, Minato-ku, Tokyo (JP)

(72) Inventors: Tomokazu Kawahara, Kanagawa (JP); Tatsuo Kozakaya, Kanagawa (JP); Osamu Yamaguchi, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/169,242

(22) Filed: Jan. 31, 2014

(65) Prior Publication Data

US 2014/0219554 A1 Aug. 7, 2014

(30) Foreign Application Priority Data

Feb. 6, 2013 (JP) .................... 2013-21395

(51) Int. Cl.
 *G06K 9/00* (2006.01)
 *G06K 9/62* (2006.01)
(52) U.S. Cl.
 CPC .................... *G06K 9/6228* (2013.01)
(58) Field of Classification Search
 CPC ....................................................... G06K 9/481
 USPC ......................................................... 382/159
 See application file for complete search history.

(56) References Cited

U.S. PATENT DOCUMENTS

| | | | | | |
|---|---|---|---|---|---|
| 6,134,344 | A | * | 10/2000 | Burges | 382/155 |
| 7,233,692 | B2 | * | 6/2007 | Li et al. | 382/159 |
| 8,254,699 | B1 | * | 8/2012 | Zhao et al. | 382/224 |
| 2003/0012435 | A1 | * | 1/2003 | Forde | 382/167 |
| 2003/0059115 | A1 | * | 3/2003 | Nakagawa | 382/197 |
| 2007/0122009 | A1 | * | 5/2007 | Jee et al. | 382/118 |
| 2009/0154792 | A1 | * | 6/2009 | Sun et al. | 382/154 |
| 2009/0232399 | A1 | * | 9/2009 | Kawahara et al. | 382/190 |
| 2010/0034465 | A1 | * | 2/2010 | Watanabe et al. | 382/190 |
| 2012/0052473 | A1 | * | 3/2012 | Kozakaya | 434/322 |
| 2012/0328199 | A1 | * | 12/2012 | Woo et al. | 382/197 |

FOREIGN PATENT DOCUMENTS

| | | |
|---|---|---|
| JP | 2010-044439 | 2/2010 |
| JP | 2012-048624 | 3/2012 |

OTHER PUBLICATIONS

Sinha, Sudipta N. Frahm, Jan-Michael, Pollefys, Marc, Genc, Yakup. "GPU-based Video Feature Tracking and Matching" Edge, Workshop on Edge Computing using New Commodity Architectures. 2006.*

Duda et al., Pattern Classification, Wiley-Interscience p. 115-117.

* cited by examiner

*Primary Examiner* — Edward Park
*Assistant Examiner* — Molly Delaney
(74) *Attorney, Agent, or Firm* — Amin, Turocy & Watson LLP; Gregory Turocy

(57) ABSTRACT

When a feature vector is converted to a reduced vector, a converting unit samples N components of interest from the M components of the feature vector, executes the process of calculating one component of the reduced vector from the N components of interest by d times to create the d-dimensional reduced vector and, the converting unit (1) excludes the components within a predetermined distance D in the same row as the previous component of interest sampled at the previous sampling, (2) excludes the components in the same column as the previous component of interest including the component k rows apart and within the distance (D−k) from the component k rows apart, and (3) samples the component of interest of this time from the remaining components after exclusion when sampling the component of interest.

7 Claims, 9 Drawing Sheets

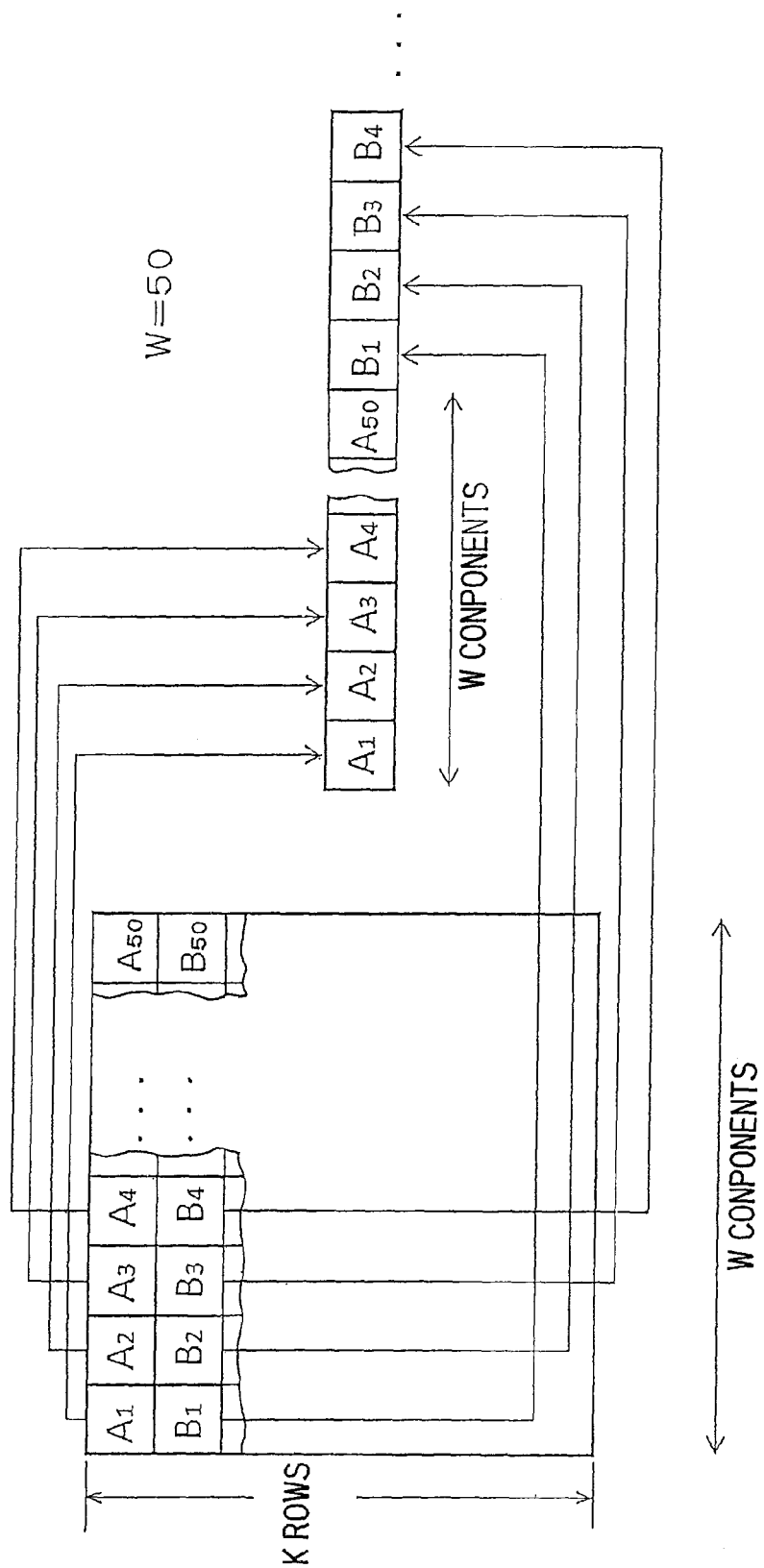

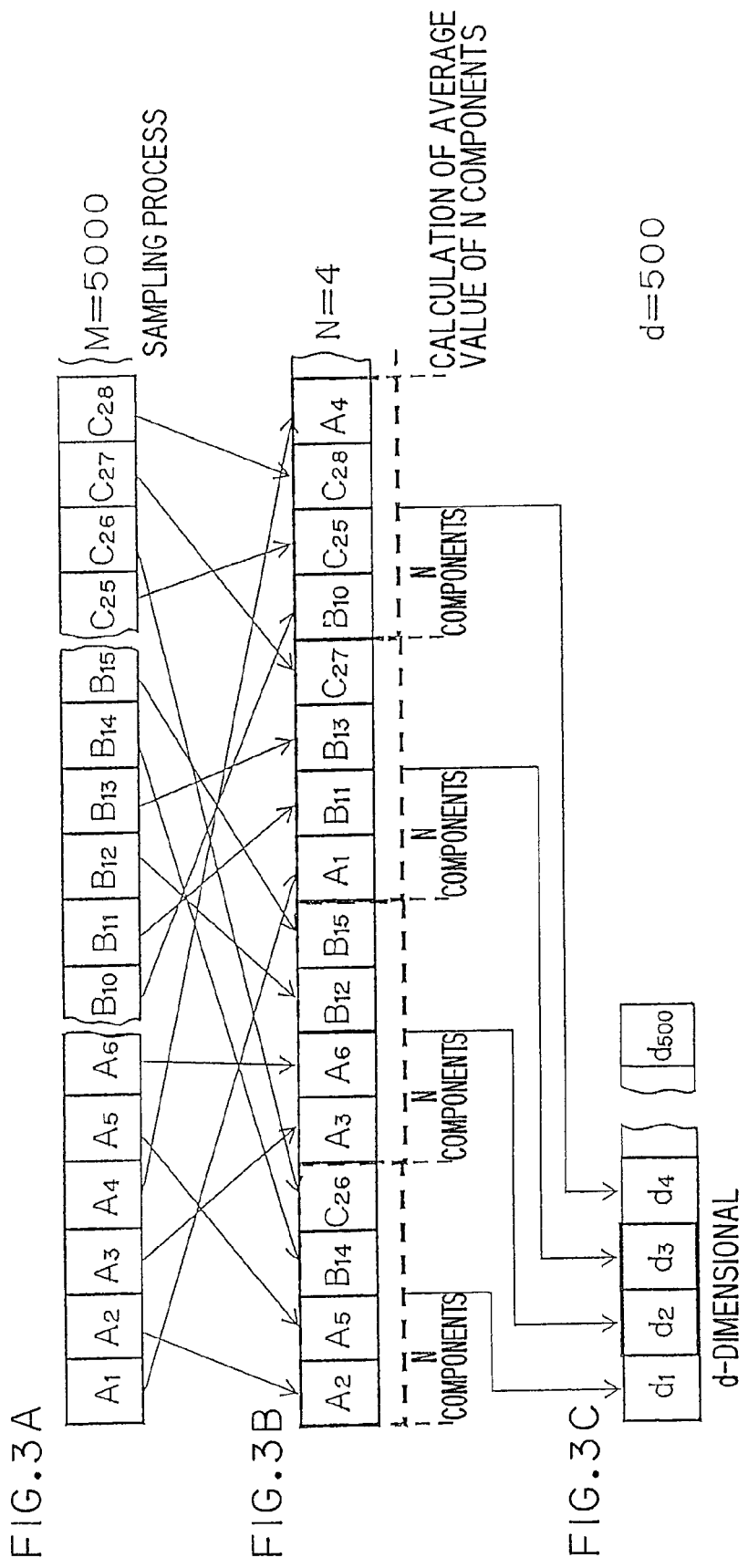

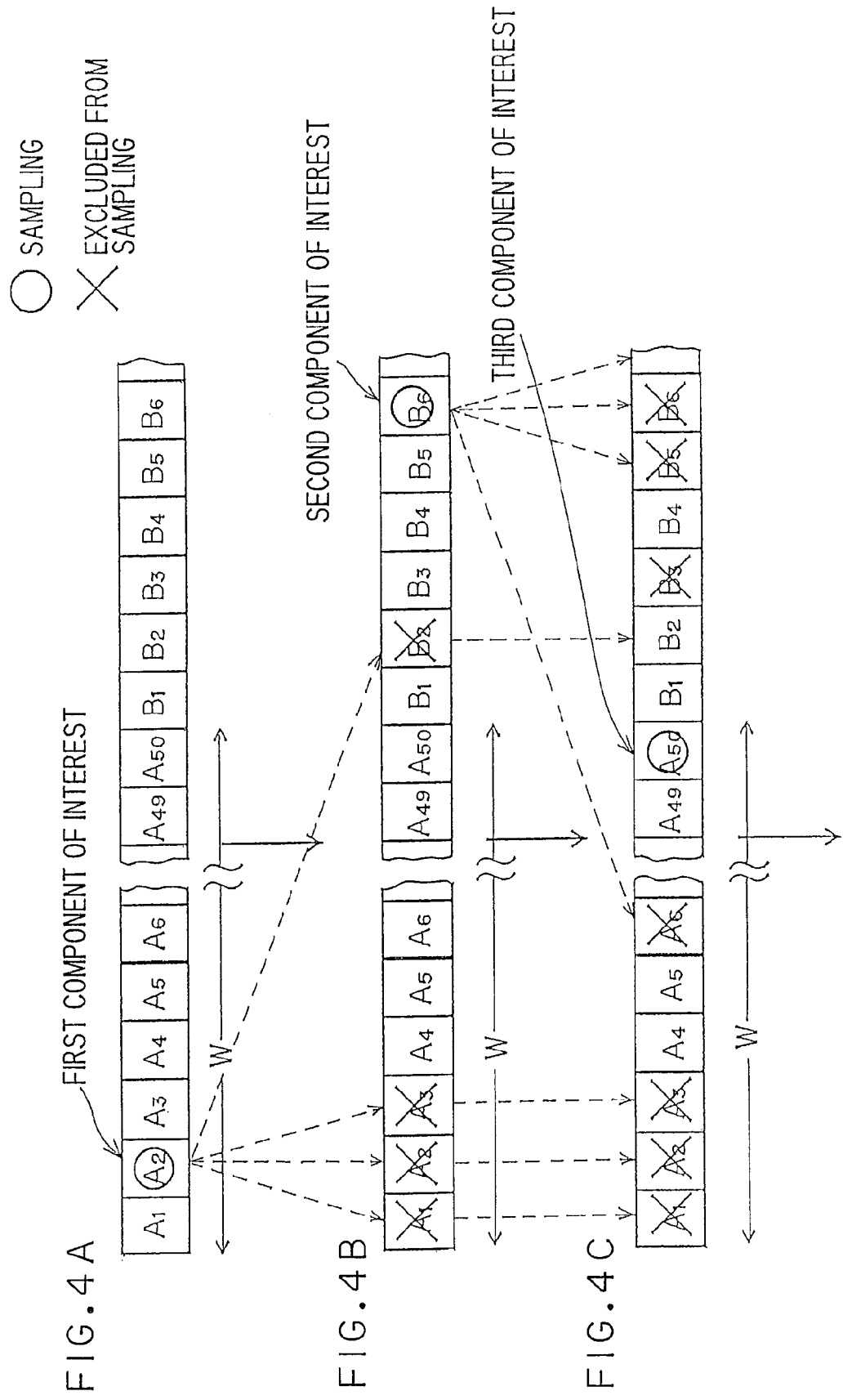

FIG.5

D<5   FIRST COMPONENT OF INTEREST

| | K=0 | K=1 | K=2 | K=3 | K=4 | K=5 | K=6 | K=7 |
|---|---|---|---|---|---|---|---|---|
| | $A_1$ | $B_1$ | $C_1$ | $E_1$ | $F_1$ | $G_1$ | | |
| | $A_2$ | $B_2$ | $C_2$ | $E_2$ | $F_2$ | $G_2$ | | |
| | $A_3$ | $B_3$ | $C_3$ | $E_3$ | $F_3$ | $G_3$ | | |
| | $A_4$ | $B_4$ | $C_4$ | $E_4$ | $F_4$ | $G_4$ | | |
| | $A_5$ | $B_5$ | $C_5$ | $E_5$ | $F_5$ | $G_5$ | | |
| | $A_6$ | $B_6$ | $C_6$ | $E_6$ | $F_6$ | $G_6$ | | |
| | $A_7$ | $B_7$ | $C_7$ | $E_7$ | $F_7$ | $G_7$ | | |
| | $A_8$ | $B_8$ | $C_8$ | $E_8$ | $F_8$ | $G_8$ | | |
| | $A_9$ | $B_9$ | $C_9$ | $E_9$ | $F_9$ | $G_9$ | | |
| | $A_{10}$ | $B_{10}$ | $C_{10}$ | $E_{10}$ | $F_{10}$ | $G_{10}$ | | |
| | $A_{11}$ | $B_{11}$ | $C_{11}$ | $E_{11}$ | $F_{11}$ | $G_{11}$ | | |
| | $A_{12}$ | $B_{12}$ | $C_{12}$ | $E_{12}$ | $F_{12}$ | $G_{12}$ | | |
| | $A_{13}$ | $B_{13}$ | $C_{13}$ | $E_{13}$ | $F_{13}$ | $G_{13}$ | | |
| | $A_{14}$ | $B_{14}$ | $C_{14}$ | $E_{14}$ | $F_{14}$ | $G_{14}$ | | |
| | $A_{15}$ | $B_{15}$ | $C_{15}$ | $E_{15}$ | $F_{15}$ | $G_{15}$ | | |
| | $A_{16}$ | $B_{16}$ | $C_{16}$ | $E_{16}$ | $F_{16}$ | $G_{16}$ | | |

FIG.6

| CATEGORY ID | REDUCTION LEARNED VECTOR |
|---|---|
| 1 | $(t_{11}, t_{12}, t_{13}, \cdots, t_{1d})$ |
| $\vdots$ | $\vdots$ |
| j | $(t_{j1}, t_{j2}, t_{j3}, \cdots, t_{jd})$ |

PATTERN RECOGNITION APPARATUS, METHOD THEREOF, AND PROGRAM PRODUCT THEREFOR

CROSS-REFERENCE TO RELATED APPLICATIONS

This application is based upon and claims the benefit of priority from the prior Japanese Patent Application No. 2013-21395, filed on Feb. 6, 2013; the entire contents of which are incorporated herein by reference.

FIELD

Embodiments described herein relate generally to a pattern recognition apparatus, a method thereof, and a program product therefor.

BACKGROUND

There are methods of reducing dimensions of a feature vector used in pattern recognition as described below.

A first method is a method of reducing the dimensions from a high order to a low order by using a projection matrix obtained from learned data prepared in advance by an analysis of principal component. However, with the first method, a memory which is the square of dimensions for memorizing the projection matrix and a large capacity of memory and amount of calculation for a product-sum operation of the square of the dimensions for calculating the projection are required.

As a second method which does not require the large capacity of memory and amount of calculation, there is a method of reducing the dimensions by extracting components of the feature vector randomly. However, since this second method depends on the number of components that a recognition performance extracts, if the dimension reduction is performed significantly, the recognition performance is significantly reduced.

As a third method, there is a method of dividing the components of the feature vector into a plurality of sections, like an areal mean method as an image reduction method, and employing an average value of the respective sections as a component of the feature vector reduced in dimension. However, with the third method, if the correlation of the components to be averaged is high, the recognition performance is lowered.

With the methods of the related art as described above, there is a problem that the dimension reduction of the feature vector used in the pattern recognition can hardly be performed with a small capacity of memory and amount of calculation while maintaining the recognition performance.

Accordingly, in order to solve the problem described above, the embodiments disclosed here provide a pattern recognition apparatus capable of performing the dimension reduction of the feature vector used in the pattern recognition with a small capacity of memory and amount of calculation while maintaining the recognition performance, a method thereof, and a program product therefor.

BRIEF DESCRIPTION OF THE DRAWINGS

FIG. 2 is a drawing of a vector conversion according to a raster scan;

FIGS. 3A, 3B, and 3C are drawings illustrating a conversion of the feature vector;

FIGS. 4A, 4B, and 4C are drawings of a sampling when $D<2$ is satisfied;

FIG. 5 is a drawing of a sampling when $D<5$ is satisfied;

FIG. 6 is a drawing illustrating a recognition table memorized in a memory;

DETAILED DESCRIPTION

Figure 1:
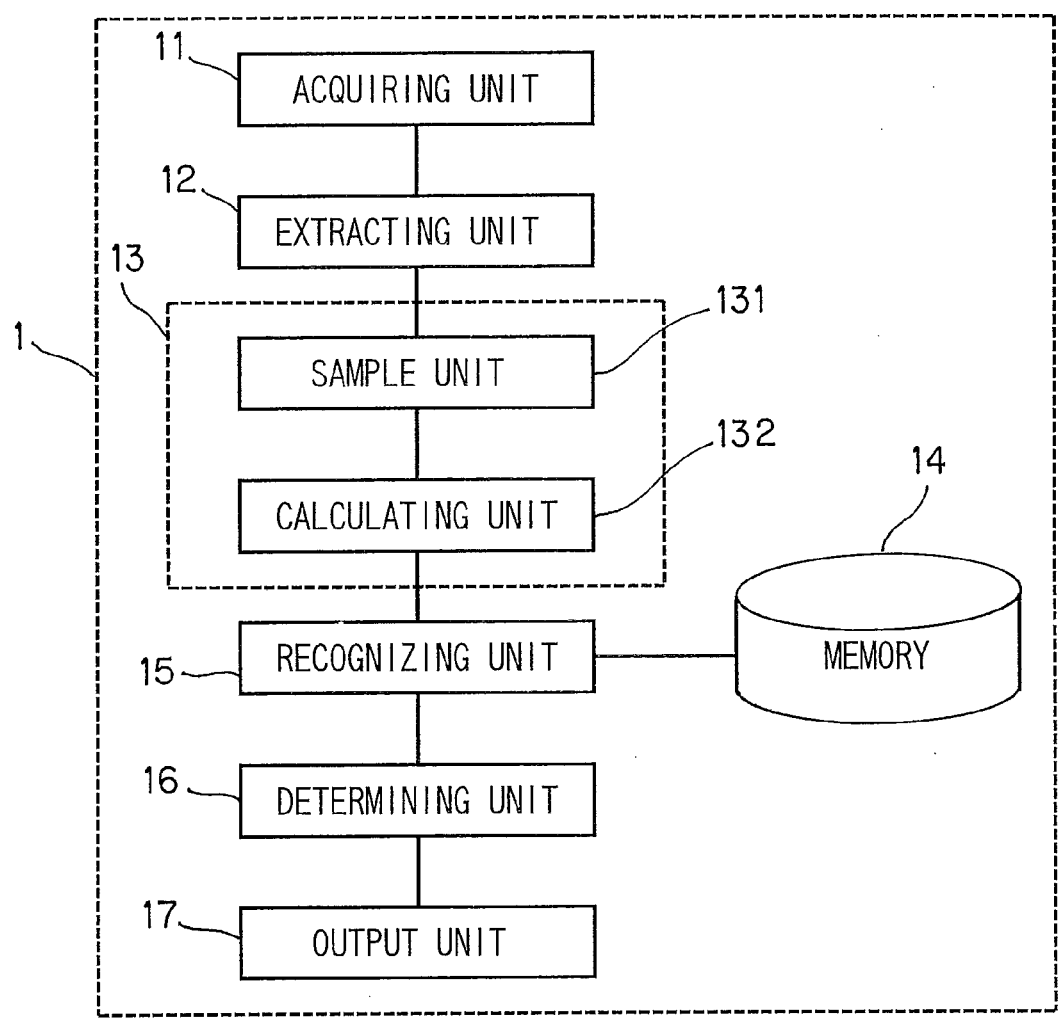
FIG. 1 is a block diagram of a pattern recognition apparatus according to one embodiment.

According to embodiments, there is provided a pattern recognition apparatus including: an acquiring unit configured to acquire an image as a pattern; an extracting unit configured to perform a raster scan for W columns in the lateral direction and K rows in the vertical direction on the pattern and extract an M-dimensional feature vector having M components; a converting unit configured to reduce the dimensions of the M-dimensional feature vector to convert into a d-dimensional ($M>d>0$) reduced vector; a memory to store a set of reduction learned vectors learned in advance so as to correspond to each of categories; a recognizing unit configured to calculate a degree of similarity between the converted reduced vector and the reduction learned vector for each of the categories; and a determining unit configured to determine the category corresponding to the reduction learned vector similar to the reduced vector to be the category which the pattern belongs to on the basis of the degree of similarity, wherein the converting unit samples N ($M>N>0$) components of interest from the M components of the feature vector, executes the process of calculating one component of the reduced vector from the N components of interest by d times to create the d-dimensional reduced vector, and the converting unit (1) excludes the components within a predetermined distance D in the same row as the previous component of interest sampled at the previous sampling, (2) excludes the components in the same column as the previous component of interest including the component k rows ($K>k>0$) apart and within the distance ($D-k$) from the component k rows apart, and (3) samples the component of interest of this time from the remaining components after exclusion when sampling the component of interest.

Referring now to the drawings, a pattern recognition apparatus 1 according to one embodiment will be described. The pattern recognition apparatus 1 according to the embodiment outputs a category that an input pattern belongs to, from the pattern.

Embodiment 1

Referring now to FIG. 1 to FIG. 8, the pattern recognition apparatus 1 according to Embodiment 1 will be described.

A configuration of the pattern recognition apparatus 1 will be described with reference to FIG. 1. FIG. 1 is a block diagram illustrating the pattern recognition apparatus 1.

The pattern recognition apparatus 1 includes an acquiring unit 11, an extracting unit 12, a converting unit 13, a memory 14, a recognizing unit 15, a determining unit 16, and an output unit 17, and the converting unit 13 includes a sample unit 131 and a calculating unit 132.

In the pattern recognition apparatus 1, the acquiring unit 11 acquires a pattern as an input, the extracting unit extracts an M-dimensional feature vector obtained by digitalizing the characteristic of the pattern from the pattern, the converting unit 13 converts the dimensions of the M-dimensional feature vector into a reduced d-dimensional (M>d>0) vector (hereinafter, referred to as a "reduced vector"), the recognizing unit 15 calculates the degree of similarity between the reduced vectors corresponding to categories stored in the memory 14 in advance and the reduced vector converted by the converting unit 13, the determining unit 16 determines a category exceeding a threshold value and having the highest degree of similarity from among the degrees of similarity corresponding to all the categories as a category of an input pattern, and the output unit 17 outputs the category.

The acquiring unit 11 acquires a pattern from a camera, a memory medium, or other apparatuses as an input. The pattern is an image. The image includes static images and movies. Image data of an object to be recognized cut out from the image is also applicable.

For example, when the category to be recognized is a face or a substance, a face region or a substance region is detected from the image, and an image obtained by cutting out the face region or the substance region is used as the input pattern.

Hereinafter, in Embodiment 1, the object to be recognized in the face region is a face, and the pattern is an image in which the face region appears. As a substance other than the face, for example, an entire body or parts of the body (for example, upper half body, lower half body, hand, leg, and so on) of human, those existing on roads such as automotive vehicles, bicycles, or signs, food such as vegetables, fruits, meat, fish, bread, lunch boxes, prepared foods, sweet stuffs, plants such as flowers or trees, animals such as dogs, cats, birds, fish, and, buildings, clouds and so on.

In the following description, the image used for the pattern is assumed to be a static image including 5000 pixels in total of K=100 pixels (=100 rows) in the vertical direction, and W=50 pixels (=50 columns) in the lateral direction.

The extracting unit 12 extracts M components of one feature vector and the positions of the respective components from the pattern (one static image) as characteristics. In other words, since the pattern is an image as illustrated in FIG. 2, a raster scan is performed on the components of the respective pixels of one image, and the M-dimensional feature vector having a one-dimensional structure in which the M components are arranged in one direction is extracted as characteristics.

The term "component" means a pixel value of the pixel, for example, a luminance value. When the image has 100×50 pixels, a 5000-dimensional feature vector having 5000 components may be extracted from one image as characteristics. In other words, M is 5000 (M=5000).

As illustrated in FIG. 2, the raster scan is performed on the components (luminance value) of the respective pixels of one image to convert the same into a vector, and the number of pixels (=number of rows) in the vertical direction to be rasterscanned is K=100 (=rows). The number of pixels (=rows, or the length of one row) in the lateral direction to be rasterscanned is W=50 (=50 columns).

As illustrated in FIG. 2, the components in a first row are denoted as A1, A2, ..., A50 in sequence from the left side, and the components in the second row are denoted as B1, B2, ..., B50 in sequence from the left side. Then, the feature vector has a one-dimensional structure including 50 (=50 columns) components in the first row, 50 components in the second row, and so forth arranged side by side in sequence to the 50 components in the $100^{th}$ row. The positions of the respective components are determined, because of the one-dimensional structure, by the order when counting from the left end component and, for example, the position of the component B2 is the 52nd from the left end.

The converting unit 13 includes the sample unit 131 and the calculating unit 132, and is configured to convert one M-dimensional feature vector extracted from the pattern into a d-dimensional reduced vector having dimensions smaller than the dimensions of the feature vector. FIG. 3 illustrates the M-dimensional feature vector conversion performed by the converting unit 13. For example, the converting unit 13 converts the 5000 dimensional feature vector into a 500 dimensional reduced vector. In other words, d is 500 (d=500).

As illustrated in FIGS. 3A and 3B, the sample unit 131 samples N components from the M-dimensional feature vector components (that is, M components). The sign N is to be set in advance, and has a relationship of M>N>0 and, for example, N=4. The sampling is performed so that the correlation of the N components becomes low by considering the specific characteristics of the feature vector. The term "correlation is high" means that the components to be compared are similar, and the term "correlation is low" means that the components to be compared are not similar. In this specification, the N components to be sampled are referred to as "components of interest".

A correlation between a component of a given pixel in an image and a component of a neighbor pixel tends to be high. As illustrated in FIG. 2, when sampling components of interest by performing the raster scan on the image, if the component A2 is assumed to be the component of interest, the component A1 and the component A3 neighboring the component of interest A2 have a high correlation with respect to the component of interest A2 in the same row (lateral direction). As regards the same column (vertical direction), the correlation between the component B2 in the vertical neighborhood and the component of interest A2 is high. When looking the correlation in the vertical direction from the feature vector having a one-dimensional structure, the component B2 apart from the component of interest A2 by a width W of the image (the number of pixels for one row is 50 pixels) have a high correlation with respect to the first component of interest A2.

Therefore, the sample unit 131 excludes neighborhood components to be arranged on the side of the component of interest (for example, the component A2) in the lateral direction (for example, components A1 and A3, hereinafter, referred to as "lateral neighborhood components").

Also, the sample unit 131 excludes neighborhood components to be arranged on the side of the component of interest (for example, the component A2) in the vertical direction, that is, the neighborhood components of a position apart from the position of the component of interest by a constant multiple k of the width W of the image (for example, the components B1, B2, and B3, hereinafter, referred to as "vertical neighborhood components").

As illustrated in FIGS. 3A and 3B, the sample unit 131 excludes the lateral neighborhood components and the vertical neighborhood components of the initial component of interest and samples next component of interest from the remaining components. This is repeated by N times to sample N components of interest.

FIG. 4 illustrates an example of a method of sampling only components apart from the component of interest by a distance D or more, where D is a determined to be a distance between the components having a high correlation in advance. FIG. 4 is an example of D<2. The distance D between the components having a high correlation is calculated to match the distance on the image.

The sample unit 131 excludes components existing at the distance D (=r+k<2) from the component of interest and samples the remaining components, where R is the lateral distance of the image, and k is the vertical distance. The distance D means a distance L1 on the image. The sign k means the number of rows of the image in the vertical direction, that is, the number of rows in the raster scan.

The method of sampling will be described in sequence below.

In a first process, the sample unit 131 samples the first component of interest A2 at random from the components of the M-dimensional feature vector as illustrated in FIG. 4A. For example, the first component of interest A2 is marked with a hollow circle in FIG. 4A.

In a second process, the sample unit 131 puts an exclusion flag on the lateral neighborhood components A1 and A3 for excluding the first component of interest A2 and the lateral neighborhood components at a distance smaller than the distance D from the sampling as illustrated in FIG. 4B. In this case, since the lateral neighborhood components A1 and A3 are in the same row as the first component of interest A2, k is zero (k=0), and the sample unit 131 puts the exclusion flags on the components which satisfy D=r<2. The components A1 and A3 having the exclusion flags put thereon are marked with a "cross sign (X)" in FIG. 4B.

In a third process, the sample unit 131 puts exclusion flags on the component B2 for excluding the vertical neighborhood component B2 within a distance (D−k) of a position of constant k multiple (after k rows) of the image width W from the first component of interest A2 from the sampling. In FIG. 4B, the component B2 is marked with a cross sign (X). Since D is smaller than 2 (D<2), k is 1 (k=1) in the case of a next row of the first component of interest A2. Therefore, the sample unit 131 puts the exclusion flags on the components B2 of D=r+k=r+1<2. In other words, the sample unit 131 puts the exclusion flags on the vertical neighborhood components B2 above and below the first component of interest A2.

In a fourth process, the sample unit 131 samples the second component of interest B6 at random from the components of the M-dimensional feature vector as illustrated in FIG. 4B. In this case, the first component of interest A2 and the components A1, A3, and B2 excluded in the second process and the third process are excluded from the objects to be sampled on the basis of the exclusion flag. The second component of interest B6 is marked with a hollow circle in FIG. 4B.

In a fifth process, the sample unit 131 puts exclusion flags on the lateral neighborhood components B5 and B7 and the vertical neighborhood components A6, C6 . . . for excluding the second components of interest 86 and the lateral neighborhood components and the vertical neighborhood components at a distance smaller than the distance D from the sampling as illustrated in FIG. 4C.

In a sixth process, the sample unit 131 samples the third components of interest A50 at random from the components of the M-dimensional feature vector as illustrated in FIG. 4C. In this case, the first component of interest A2, the second component of interest 86, and the components A1, A3, excluded in the second, third, and fifth processes are excluded from the objects to be sampled on the basis of the exclusion flag. The third component of interest A50 is marked with a hollow circle in FIG. 4B.

From then onward, the N components of interest A2, B6, A50 . . . are sampled in the same manner.

For easier description, for example, an example of D<5 is illustrated in FIG. 5. The component of interest is assumed to be A10. Then, the components of A, B, C, E, F, and G are assumed to be arranged in the vertical direction. The sign D is not used because it is duplicated with the distance D.

In the first process, the sample unit 131 samples the first components of interest A10 at random from the components of the M-dimensional feature vector as illustrated in FIG. 5. The first component of interest A10 is marked with a hollow circle in FIG. 5.

In the second process, since k is zero (k=0) in the same row as the component of interest A10, D=r+0 is established, and in order to satisfy the relationship D<5, the sample unit 131 puts the exclusion flags on the components A6 of D=4, A7 of D=3, A8 of D=2, A9 of D=1, A11 of D=1, A12 of D=2, A13 of D=3, and A14 of D=4. The components on which the exclusion flags are put are lateral neighborhood components, and are marked with "X" in FIG. 5.

In the third process, since k is one (k=1) in the next row of the first component of interest A10, D=r+1 is established, and in order to satisfy the relationship D<5, the sample unit 131 puts the exclusion flags on the components B7 of D=4, B8 of D=3, B9 of D=2, B10 of D=1, B11 of D=2, B12 of D=3, and B13 of D=4. The components on which the exclusion flags are put are vertical neighborhood components, and are marked with "X" in FIG. 5.

In the fourth process, since k is two (k=2) in the second row from the first component of interest A10, D=r+2 is established, and in order to satisfy the relationship D<5, the sample unit 131 puts the exclusion flags on the components C8 of D=4, C9 of D=3, C10 of D=2, C11 of D=3, and C12 of D=4. The components on which the exclusion flags are put are vertical neighborhood components, and are marked with "X" in FIG. 5.

In the fifth process, since k is three (k=3) in the third row from the first component of interest A10, D=r+3 is established, and in order to satisfy the relationship D<5, the sample unit 131 puts the exclusion flags on the components E9 of D=4, E10 of D=3, and E11 of D=4. The components on which the exclusion flags are put are vertical neighborhood components, and are marked with "X" in FIG. 5.

In the sixth process, since k is four (k=4) in the fourth row from the first component of interest A10, D=r+4 is established, and in order to satisfy the relationship D<5, the sample unit 131 puts the exclusion flag on the component F10 of D=4. The component on which the exclusion flag is put is a vertical neighborhood component, and is marked with "X" in FIG. 5.

In a seventh process, since k is five (k=5) in the fifth row from the first component of interest A10, D=r+5 is established, and there is no component which satisfies the relationship D<5, the sample unit 131 does not put the exclusion flag on the components in the row G.

Since the description is given about the component of interest A10 at the topmost row of the image above, the description is moved on the lower rows. However, when the component of interest is in a row at the center of the image, the sampling is also performed on the rows on the upper side of the component of interest and the exclusion flags are put on.

The calculating unit 132 calculates an average value (an average illuminance value) of the sampled N components of interest (illuminance values) and employs the same as one of components of the d-dimensional reduced vector.

The converting unit 13 performs the sampling process of the N components of interest performed by the sample unit 131 and the process of calculating the average value of the N components of interest performed by the calculating unit 132 d times for converting the M-dimensional feature vector into the d-dimensional reduced vector. In this case, components to be sampled in the second to $d^{th}$ sampling of the first components of interest are determined at random from the M components.

Finally, the converting unit 13 normalizes the norm of the d-dimensional reduced vector to "1".

The memory 14 memorizes a recognition table including a set of Category ID for identifying the category and d-dimensional reduced vector learned in advance so as to correspond to the respective categories (hereinafter, "reduction learned vector"). FIG. 6 illustrates an example of the recognition table. The norm of the stored d-dimensional reduction learned vector is normalized to "1" in advance.

The recognizing unit 15 calculates a degree of similarity Q between the reduced vector obtained by the converting unit 13 and the reduction learned vector stored in the recognition table for each Category ID. The degree of similarity is expressed by values from 0 to 1, and the closer to "1", the closer to the corresponding category. For example, assuming that the inner product of the reduced vector and the reduction learned vector is the degree of similarity Q, the recognizing unit 15 calculates the degree of similarity Q by using Expression (1). In Embodiment 1, since all the amounts of feature are the reduced vector and the reduction learned vector having a length (norm) of "1", the inner product corresponds to the simple degree of similarity.

$$Qj = s1*tj1 + s2*tj2 + \ldots + sd*tjd \quad (1)$$

where s1, sd indicate the reduced vectors extracted by the converting unit 13, and tj1, ..., tjd indicate the reduction learned vectors of the Category ID=1 to J memorized in the memory 14, the relation 1<j<J is satisfied.

The recognizing unit 15 calculates the degree of similarity Qj for all the categories.

The determining unit 16 determines the category being higher than a predetermined threshold value and having the highest degree of similarity Qj to be the category to which the input pattern belongs from the degrees of similarity Q corresponding to all the categories memorized in the memory 14. When there is no degree of similarity Q not lower than the threshold value, the determining unit 16 determines that there is no category corresponding to the input pattern.

The output unit 17 outputs the determined category.

Figure 7:
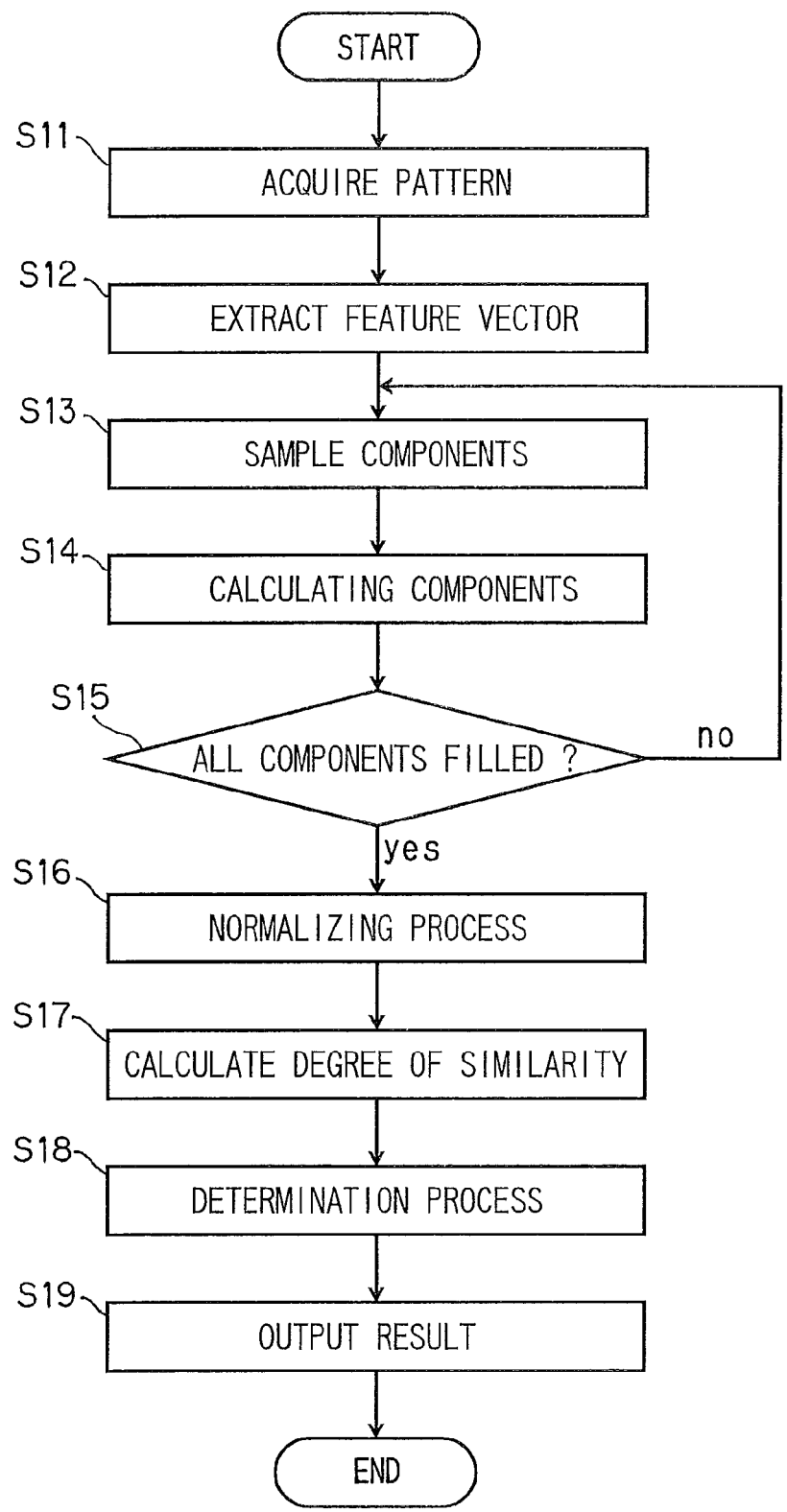
FIG. 7 is a flowchart illustrating processing to be performed by the pattern recognition apparatus.

A process to be performed by the pattern recognition apparatus 1 will be described with reference to FIG. 7. FIG. 7 is a flowchart illustrating processing to be performed by the pattern recognition apparatus 1. The process illustrated in the flowchart in FIG. 7 is performed every time when the acquiring unit 11 acquires a pattern.

In Step S11, the acquiring unit 11 acquires the pattern (S11). The acquiring unit 11 supplies the acquired pattern to the extracting unit 12.

In Step S12, the extracting unit 12 extracts the M-dimensional feature vector from the pattern (S12). The extracting unit 12 supplies the feature vector to the sample unit 131 of the converting unit 13.

In Step S13, the sample unit 131 samples the N components of interest from the M-dimensional feature vector (S13). The sample unit 131 supplies sampled N components of interest to the calculating unit 132.

In Step S14, the calculating unit 132 calculates an average value of the sampled N components of interest and substitutes as one of components of the d-dimensional reduced vector (S14).

In Step S15, the calculating unit 132 determines whether or not all the components (d components) of the d-dimensional reduced vector are calculated (S15). If all the components of the d-dimensional reduced vector are not calculated (S15: No), the procedure goes to Step S13, where the sample unit 131 samples next N components of interest from the feature vector. If the d components of the d-dimensional reduced vector are calculated (S15: YES), the d-dimensional reduced vector is supplied to the recognizing unit 15 and Step S16 is executed.

In Step S16, the recognizing unit 15 normalizes the converted reduced vector to the norm "1".

In Step 17, the recognizing unit 15 calculates the degree of similarity Q between the converted reduced vector and the reduction learned vector for each Category ID memorized in the memory 14, respectively (S16). Then, the recognizing unit 15 supplies the degree of similarity Q corresponding to Category ID to the determining unit 16 for all the categories.

In Step 18, the determining unit 16 determines the category which the pattern belongs to from the degree of similarity Q corresponding to Category ID (S17). The determining unit 16 supplies a category as a result of determination to the output unit 17.

In Step 19, the output unit 17 outputs a category as a result of determination (S18).

According to Embodiment 1, the feature vector extracted from the input pattern may be reduced in dimension at high speed with a small capacity of memory. Since the components to be averaged are sampled so that the correlation becomes low, and hence the recognition performance may be maintained.

Figure 8:
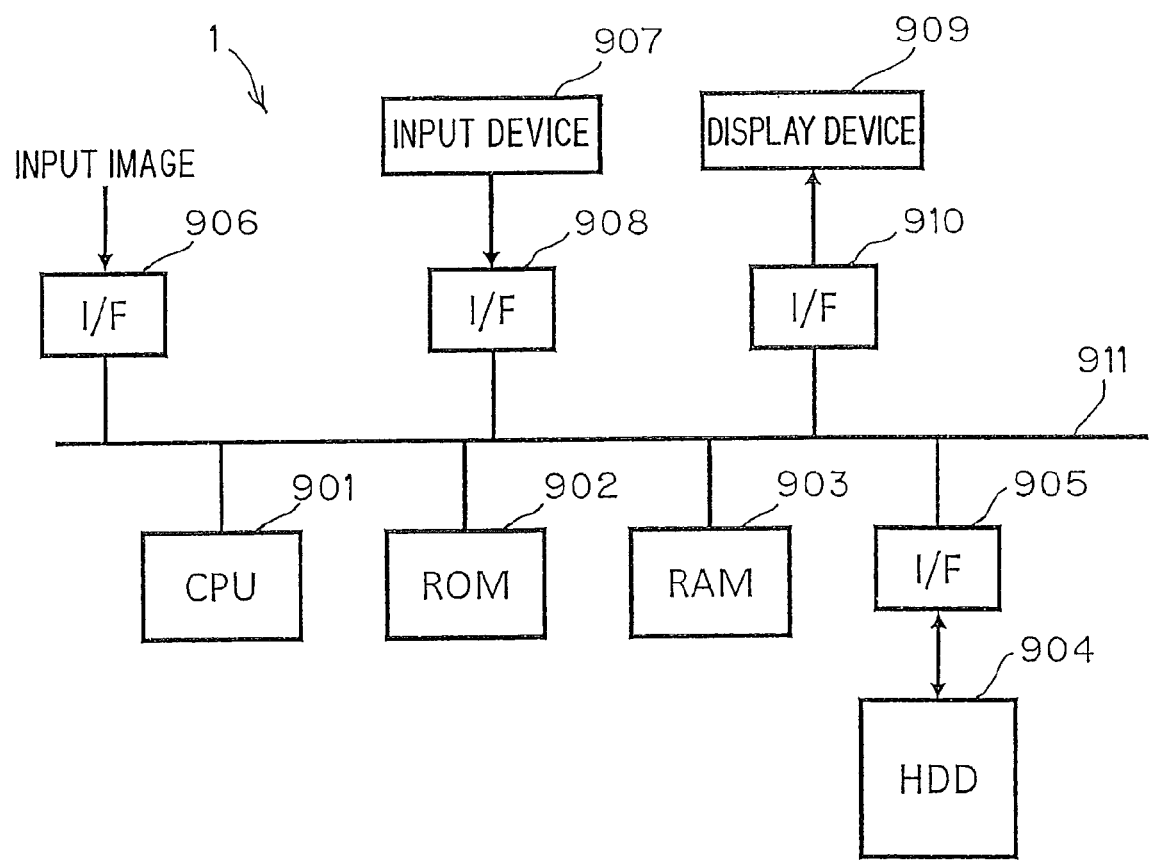
FIG. 8 is a block diagram illustrating an example of a hardware configuration of the pattern recognition apparatus.

FIG. 8 is a block diagram illustrating an example of a hardware configuration of the pattern recognition apparatus 1. As illustrated in FIG. 8, the pattern recognition apparatus 1 includes a CPU 901, an ROM 902 configured to memorize a recognition program or the like configured to perform recognition of the category which a pattern belongs to from the pattern, an RAM 903, an HDD 904 configured to memorize the recognition table or the like, an I/F 905 as an interface with respect to the HDD 904, an I/F 906 as an interface for the pattern input, an input device 907 such as a mouse and a keyboard, an I/F 908 as an interface with respect to the input device 907, a display device 909 such as a display, an I/F 810 as an interface with respect to the display device 909, and a bus 811, which is a hardware configuration using a normal computer. The CPU 901, the ROM 902, the RAM 903, the I/F 905, the I/F 906, the I/F 908, and the I/F 810 are connected to each other via the bus 811.

In the pattern recognition apparatus 1, the CPU 901 reads out the program from the ROM 902 on the RAM 903 and executes the same, whereby the respective units (the acquiring unit, the extracting unit, and the calculating unit, etc.) are realized on the computer, and the processing of the input pattern from the I/F 906 is performed by using matching data or the like memorized in the HDD 904.

The program may be memorized in the HDD 904. The program may be provided by being memorized in a computer readable memory medium such as a CD-ROM, a CD-R, a memory card, a DVD, and a flexible disk (FD) which has an installable format, or an executable format. The program may be stored in a computer connected to a network such as the Internet and provided by allowing a user to download via the network. The program may be provided or distributed via the network such as the Internet. The table in FIG. 7 may be stored in the ROM 902. The images may be stored in the HDD 904, and input from the I/F 905.

Embodiment 2

Figure 9:
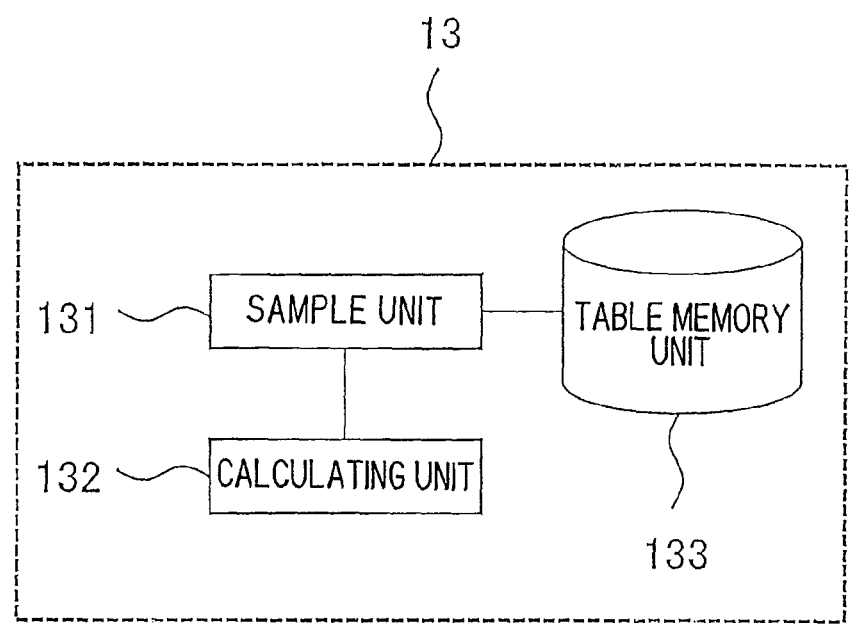
FIG. 9 is a block diagram of a modification of a converting unit.
Figure 10:
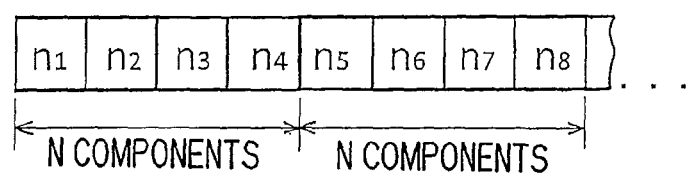
FIG. 10 is a drawing illustrating a sampling table memorized in a table memory unit.

Referring now to FIG. 9 and FIG. 10, the pattern recognition apparatus 1 according to Embodiment 2 will be described.

The converting unit 13 of Embodiment 2 further includes a table memory unit 133 in which a sampling table is stored as illustrated in FIG. 9. The sampling table is a table for storing the order of sampling as illustrated in FIG. 10. The order of sampling means the numbers which indicate the positions of the components of the M-dimensional feature vector. Then, the sample unit 131 samples N components on the basis of the sampling table number. The order which is predetermined is maintained on the basis of the process that the sample unit 131 samples.

The sample unit 131 performs the sampling firstly the $n1^{st}$ component, secondly the $n2^{nd}$ component, until Nth $nN^{th}$ component. The next sampling starts from the $n(N+1)^{th}$ component.

Modification

In the embodiments described above, the extracting unit 12 extracts the feature vector by performing the raster scan on the image. Instead, however, the extracting unit 12 may apply a file such as Gabor or Sobel on the image before performing the raster scan on the image, then perform the raster scan, and extract the feature vector. It is also possible to use the histogram of a combination of co-occurrence relation of the luminance gradient used in Patent Document 1 converted into a vector as the feature vector.

In the embodiments described above, the sample unit 131 uses the distance L1 on the image for determining the component on which the exclusion flag is put on the basis of the components of interest. Instead, however, a distance L2 or other distances may be used. When the distance L2 is used, the distance $D=\sqrt{(r^2+k^2)}$ is satisfied.

In the embodiments described above, the calculating unit 132 calculates an average value of the sampled N components of interest and employs the same as one of components of the d-dimensional reduced vector. Instead, however, the sum of the components of interest (for example, luminance value) may be calculated instead of the average value.

In the embodiments described above, a design that allows the sample unit 131 to perform the sampling may be costly for calculation. Therefore, by using the feature that the lowering of the recognition performance is minor even when the component having a high correlation is included if it is a small amount, the sample unit 131 may sample so that the correlation in terms of the vertical distance of the image becomes lower than the case of the section average value. For example, the correlation in terms of the vertical distance may be lowered in comparison with the case of the section average value by the sample unit 131 sampling at random.

The converting unit 13 may use the norm of the d-dimensional reduced vector as-is without normalization although it is normalized to "1" in the embodiments described above.

In the embodiments describe above, a simple degree of similarity is used for recognizing the category of the recognizing unit 15. Instead, however, the distance between the reduced vectors to be compared may also be used. In this case, the closer to the distance zero, the more the input pattern becomes similar to the corresponding category. While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A pattern recognition apparatus comprising:
an acquiring unit configured to acquire an image as a pattern;
an extracting unit configured to perform a raster scan for W columns in the lateral direction and K rows in the vertical direction on the pattern and extract an M-dimensional feature vector having M components;
a converting unit configured to reduce the dimensions of the M-dimensional feature vector to convert into a d-dimensional (M>d>0) reduced vector;
a memory to store a set of reduction learned vectors learned in advance so as to correspond to each of categories;
a recognizing unit configured to calculate a degree of similarity between the converted reduced vector and the reduction learned vector for each of the categories; and
a determining unit configured to determine the category corresponding to the reduction learned vector similar to the reduced vector to be the category which the pattern belongs to on the basis of the degree of similarity, wherein
the converting unit samples N (M>N>0) components of interest from the M components of the feature vector, executes the process of calculating one component of the reduced vector from the N components of interest by d times to create the d-dimensional reduced vector, and
the converting unit (1) excludes the components that are arranged in same row as previously-designated component of interest, which has been sampled at previous sampling, and are within a predetermined distance D from the previously-designated component of interest, (2) excludes the components that are arranged in same column as the previously-designated component of interest, and are within a predetermined distance D from the previously-designated component of interest, (3) excludes any of the components, which is distanced from any of currently excluded component in the same row, by k rows (K>k>0), and is within a distance D−k from any of currently excluded component in the same column, and (4) samples currently-designated component of interest from remaining components that are remained after accumulated exclusion of components from first exclusion through current exclusion.

2. The apparatus according to claim 1, wherein the converting unit obtains an average value or a value of the sum of the sampled N components of interest when calculating one component of the reduced vector.

3. The apparatus according to claim 1, wherein the converting unit performs the sampling on the basis of a sampling table in which the position of the component to be sampled in the feature vector and the order of the sampling are defined when sampling the N components of interest from the feature vector.

4. The apparatus according to claim 2, wherein the converting unit performs the sampling on the basis of a sampling table in which the position of the component to be sampled in the feature vector and the order of the sampling are defined when sampling the N components of interest from the feature vector.

5. The apparatus according to claim 1, wherein the categories include persons or general substances.

6. A pattern recognizing method comprising;
acquiring an image as a pattern;
performing a raster scan for W columns in the lateral direction and K rows in the vertical direction on the pattern and extracting an M-dimensional feature vector having M components;
reducing the dimensions of the M-dimensional feature vector to convert into a d-dimensional (M>d>0) reduced vector;
storing a set of reduction learned vectors learned in advance so as to correspond to each of categories;
calculating a degree of similarity between the converted reduced vector and the reduction learned vector for each of the categories;
determining the category corresponding to the reduction learned vector similar to the reduced vector to be the category which the pattern belongs to on the basis of the degree of similarity,
sampling N (M>N>0) components of interest from the M components of the feature vector, executing the process of calculating one component of the reduced vector from the N components of interest by d times to create the d-dimensional reduced vector when converting, and
further (1) excluding the components that are arranged in same row as previously-designated component of interest which has been sampled at previous sampling, and are within a predetermined distance D from the previously-designated component of interest, (2) excluding the components that are arranged in same column as the previously-designated component of interest, and are within a predetermined distance D from the previously-designated component of interest, (3) excluding any of the components, which is distanced from any of currently excluded component in the same row, by k rows (K>k>0), and is within a distance D−k from any of currently excluded component in the same column, and (4) sampling currently-designated component of interest from remaining components that are remained after accumulated exclusion of components from first exclusion through current exclusion.

7. A pattern recognizing program product stored in a computer readable non-transitory medium, causing a computer to perform an acquiring function configured to acquire an image as a pattern;
an extracting function configured to perform a raster scan for W columns in the lateral direction and K rows in the vertical direction on the pattern and extract an M-dimensional feature vector having M components;
a converting function configured to reduce the dimensions of the M-dimensional feature vector to convert into a d-dimensional (M>d>0) reduced vector;
a memory function configured to store a set of reduction learned vectors learned in advance so as to correspond to each of categories;
a recognizing function configured to calculate a degree of similarity between the converted reduced vector and the reduction learned vector for each of the categories; and
a determining function configured to determine the category corresponding to the reduction learned vector similar to the reduced vector to be the category which the pattern belongs to on the basis of the degree of similarity, wherein
the converting function samples N (M>N>0) components of interest from the M components of the feature vector, executes the process of calculating one component of the reduced vector from the N components of interest by d times to create the d-dimensional reduced vector, and
the converting function (1) excludes the components that are arranged in same row as previously-designated component of interest, which has been sampled at previous sampling, and are within a predetermined distance D from the previously-designated component of interest, (2) excludes the components that are arranged in same column as the previously-designated component of interest, and are within a predetermined distance D from the previously-designated component of interest, (3) excludes any of the components, which is distanced from any of currently excluded component in the same row, by k rows (K>k>0), and is within a distance D−k from any of currently excluded component in the same column, and (4) samples currently-designated component of interest from remaining components that are remained after accumulated exclusion of components from first exclusion through current exclusion.

* * * * *